United States Patent

Work

[11] 4,109,488
[45] Aug. 29, 1978

[54] SHOCK ABSORBING ROTARY DRIVE COUPLING

[75] Inventor: John Thompson Work, Anaheim, Calif.

[73] Assignee: BJ-Hughes Inc., Long Beach, Calif.

[21] Appl. No.: 743,565

[22] Filed: Nov. 22, 1976

[51] Int. Cl.² ........................ F16D 3/54; F16F 15/10
[52] U.S. Cl. .............................. 64/11 R; 64/27 NM; 64/13
[58] Field of Search .................. 64/13, 11 R, 27 NM; 267/137; 74/188

[56] References Cited

U.S. PATENT DOCUMENTS

| | | | |
|---|---|---|---|
| 1,642,775 | 9/1927 | Henry | 64/13 |
| 2,497,623 | 2/1950 | Nolen | 64/13 |
| 2,742,769 | 4/1956 | Gleeson | 64/13 |
| 2,945,365 | 7/1960 | Ulderup | 64/11 R |
| 3,500,659 | 3/1970 | Martin | 64/27 NM |
| 3,746,330 | 7/1973 | Tacruk | 64/11 R |
| 3,947,009 | 3/1976 | Nelmark | 267/137 |

Primary Examiner—Benjamin W. Wyche
Assistant Examiner—R. C. Turner

[57] ABSTRACT

A shock absorbing rotary drive coupling unit for drivingly connecting a tubular drive shaft to an axially aligned tubular driven shaft of a rotary blast hole drill. The unit has an annular body of resilient elastomer sandwiched between and bonded to end plates, with lugs and fasteners for connecting the end plates, respectively, to the drive shaft and the driven shaft.

12 Claims, 6 Drawing Figures

SHOCK ABSORBING ROTARY DRIVE COUPLING

BACKGROUND OF THE INVENTION

1. Field of the Invention

This invention relates to a shock absorbing, rotary drive coupling unit for drivingly connecting a tubular drive shaft to an axially aligned tubular driven shaft of a rotary blast hole drill.

2. Description of the Prior Art

Heretofore, couplings have been used to drivingly connect the drive means of a blast hole drill to the upper end of a string of drill steels. One such coupling is generally indicated in U.S. Pat. No. 3,951,470, issued Apr. 20, 1976, to Donald F. McLean. A specific form of coupling device for this purpose is disclosed in U.S. Pat. No. 3,947,009, issued Mar. 30, 1976, to Jack D. Nelmark.

SUMMARY OF THE INVENTION

In accordance with the present invention, there is provided a shock absorbing, rotary drive coupling unit for drivingly connecting a tubular drive shaft means to an axially aligned tubular driven shaft means of a rotary blast hole drill which comprises: an annular driven plate having an axis alignable with the common axis of said shaft means; an annular driving plate disposed parallel to and axially spaced from said driven plate; an annular body of resilient, elastomeric material sandwiched between said plates, one end of said body being bonded to one face of said driven plate and the other end of said body being bonded to the opposed face of said driving plate, said annular plates and said annular body providing an axial passage for the flow of pressurized drilling gas therethrough; each of said plates having a plurality of circularly arranged lug means projecting generally axially therefrom for respective engagement with complementary driving recess means on said tubular drive shaft means and with complementary driven recess means on said tubular driven shaft means; and said plates having fastener elements respectively cooperative with complementary fastener elements for maintaining said respective engagement between said lug means and said driving recess means.

The coupling unit of the invention is of straight-forward, simple construction, and has long service life. It is easily installed in the drill string and quickly and easily replaced when necessary. It is characterized by metal lugs for torque input and torque output, and by fasteners for securing the unit in the drill string, which fasteners resist axial forces tending to separate the unit from the string without having to transfer torque into and out of the unit.

Other objects and advantages of the invention will be apparent from or set forth in the following description.

DESCRIPTION OF THE PREFERRED EMBODIMENTS

Figure 1:
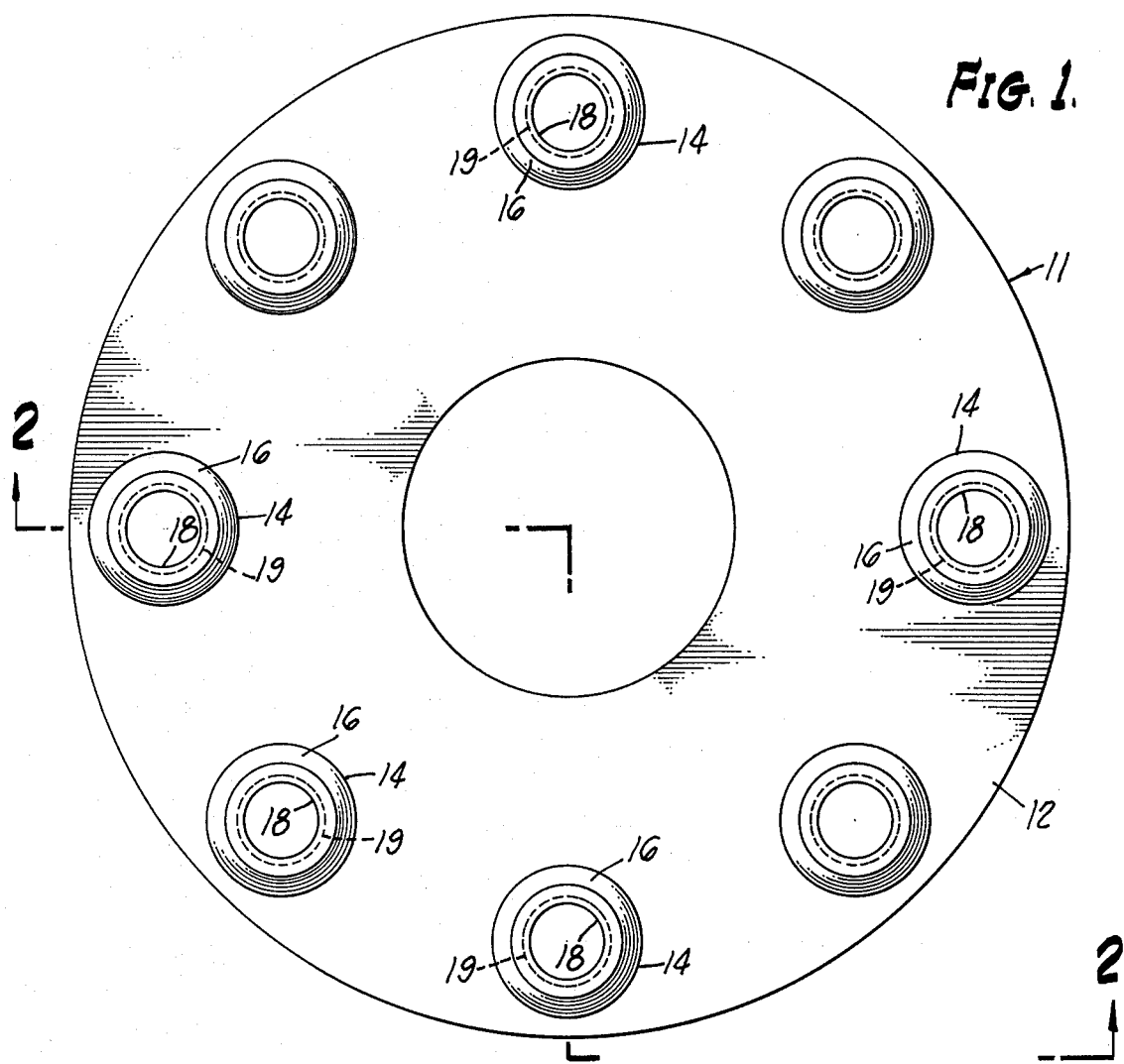
FIG. 1 is a plan view of a shock absorbing, rotary drive coupling unit in accordance with the invention.
Figure 2:
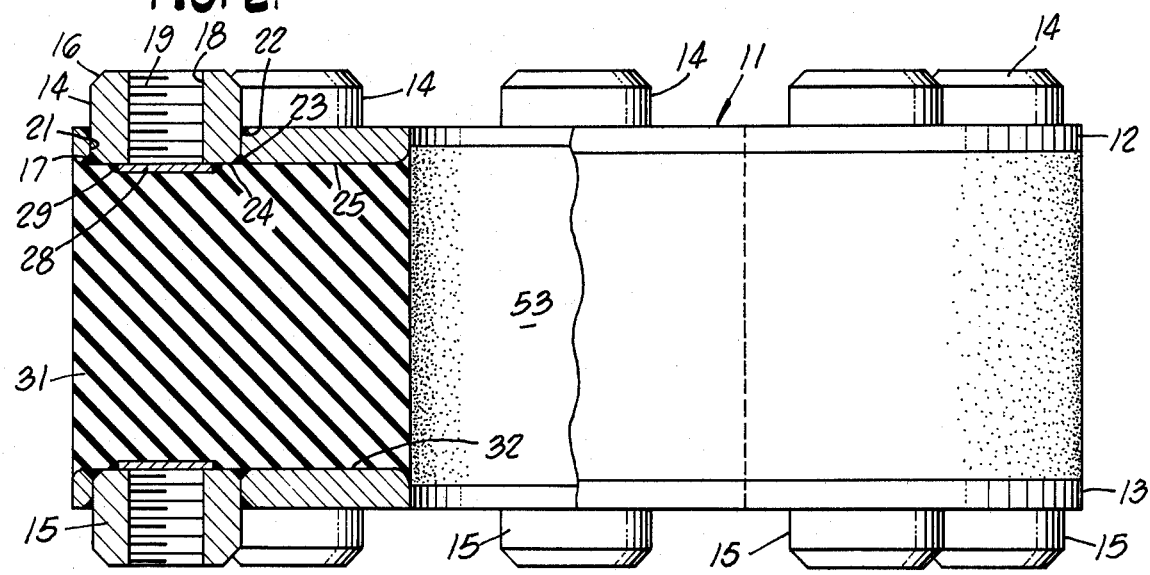
FIG. 2 is a sectional view taken along the line 2—2 of FIG. 1.

Referring to the drawings, particularly to FIGS. 1 and 2 thereof, the shock absorbing, rotary drive coupling unit shown is designated by the general reference numeral 11. It has an annular driven plate 12 at the top, and a similar annular driving plate 13 at the bottom. These two plates are axially aligned, and are disposed in vertically spaced, parallel relation to one another.

The driven plate 12 has a plurality of upstanding lugs 14, there being eight such lugs in the illustrated embodiment of the invention, although fewer or more such lugs may be used, as convenient. The lugs are circularly arranged around the driven plate, and preferably are evenly spaced therearound. Similarly, the driving plate 13 has a like number of depending lugs 15 similarly arranged thereon. For simplicity in manufacturing, the top and the bottom plate-and-lug assemblies may be made alike.

Figure 6:
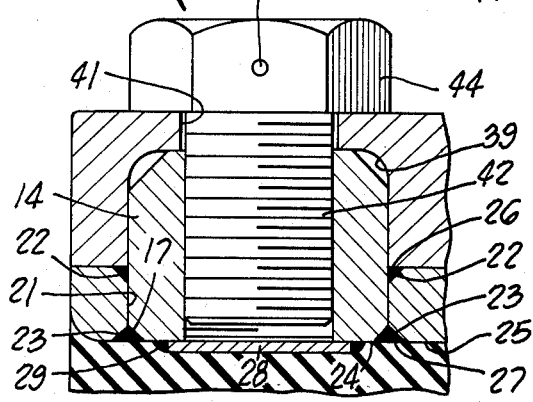
FIG. 6 is an enlarged vertical sectional view of a fragment of the assembly of FIG. 4.

A description of the lug 14, seen in section in FIGS. 2 and 6, will suffice for all of the lugs, as they are identical. This lug 14 is cylindrical and, for example, has a length about two and one-half times the thickness of the plate 12. The upper end of the lug has a chamfered rim 16, and the lower end 17 has a smaller chamfered rim 17. The lug has an axial bore 18 extending therethrough, the bore being threaded, as shown at 19.

The lug 14 is received with a snug fit in a hole 21 in the plate 12, the upper and lower rims of the hole being beveled at 22 and 23. The lug is positioned in the hole with its bottom face 24 flush with the bottom surface 25 of the plate 12, and is secured therein by weld metal 26 and 27.

A relatively thin disc 28 is affixed to the bottom or inner face 24 of the lug 14 by welding, as shown at 29, the disc closing the inner end of the bore 18.

It is seen that the lugs 14 and 15 are disposed with their principal axes parallel to the principal axis of the annular plates 12 and 13.

The plates 12 and 13, the lugs 14 and 15, and the discs 28 are preferably fabricated or cast of metal, namely, alloy steel.

Sandwiched between the upper and lower plate assemblies 12 and 13, is an annular body of elastomeric material 31, such as natural or synthetic rubber material that is compounded and cured to have the desired resilience, toughness, and spring rate for the loads that will be encountered. Typically, the cured rubber will have a durometer range of 35 to 75 Shore Hardness A. The rubber body is bonded to the under surface 25 of the upper plate assembly throughout their entire area of mutual contact. In like manner, the body of rubber is bonded to the upper surface 32 of the lower plate 13 assembly throughout their entire area of mutual contact. Rubber cement is preferably employed at the metal rubber interfaces to provide strong adhesion, and the body of rubber, the rubber cement, and the metal parts are cured as a unit.

Figure 3:
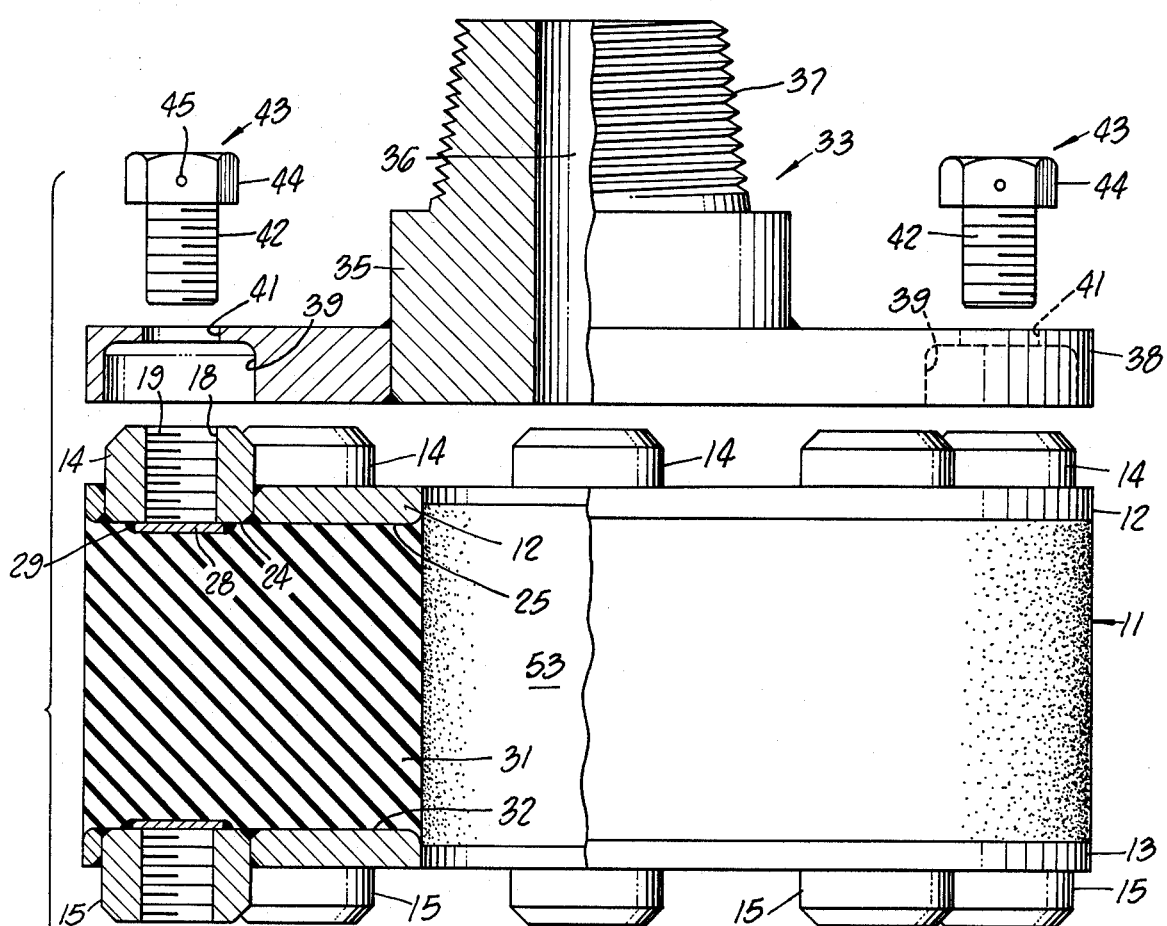
FIG. 3 is an exploded, side elevational view, partly in section, of components of a rotary blast hole drill, including the coupling unit of FIGS. 1 and 2.

Turning to FIG. 3, the components shown include the coupling unit 11, described hereinbefore, a tubular drive member 33, and a tubular driven member 34.

Figure 4:
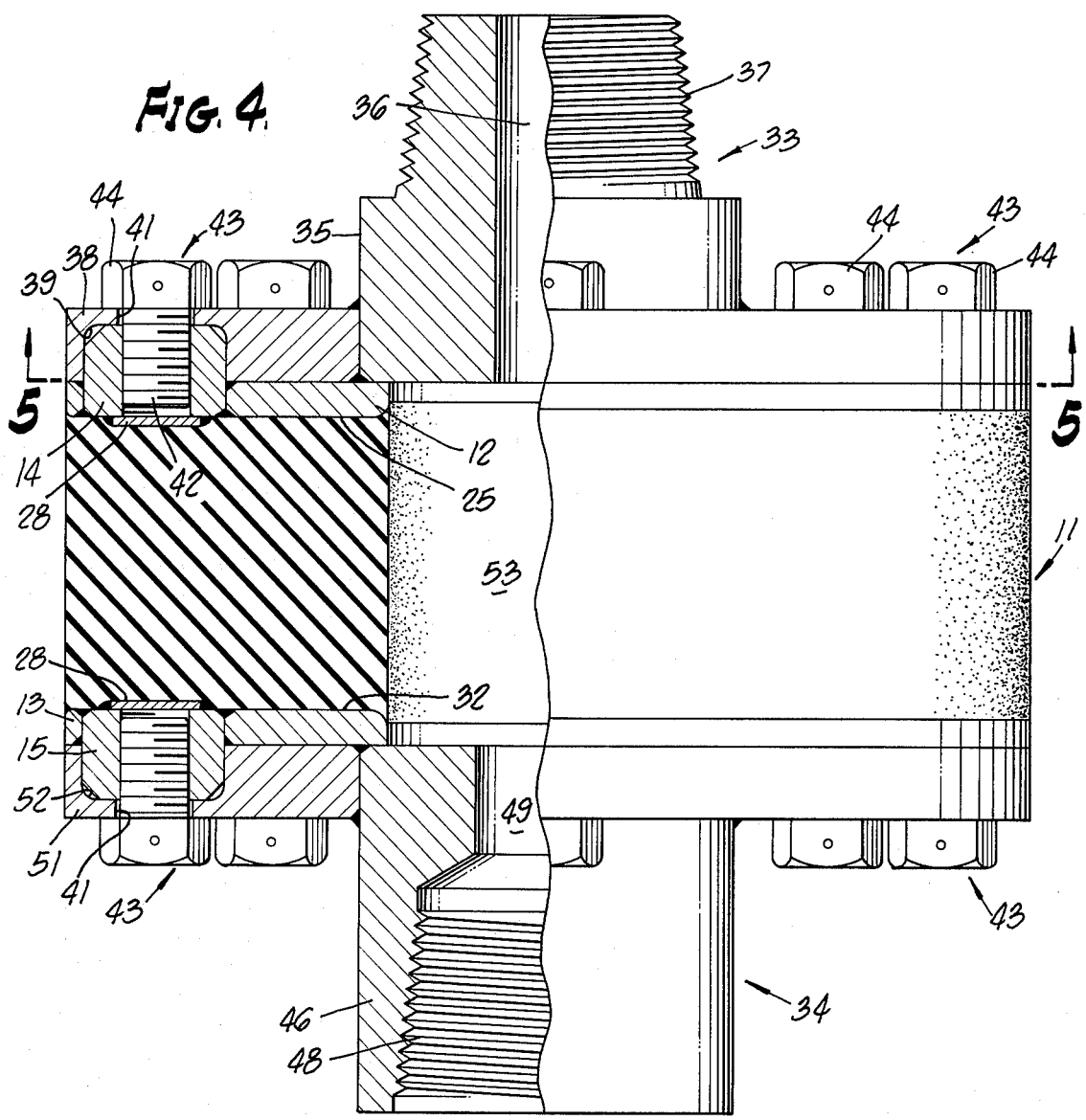
FIG. 4 is an assembly view, partly in section, of the rotary blast hole drill components shown in FIG. 3.

The drive member includes a central pin 35 provided with an axial bore 36 extending therethrough. The pin is upwardly tapered and externally threaded at 37. The lower end of the pin is fitted with a radially extending flange 38 welded thereto and provided with a plurality of downwardly opening recesses 39 aligned with the several upstanding lugs 14 of the plate 12. These recesses are sized to comfortably receive and accommodate the opposed lugs 14 when the parts are assembled, as seen in FIG. 4. Each recess has a central counterbored opening 41 adapted to allow the insertion of the shank 42 of a capscrew fastener 43 through the opening 41 and threadedly into the bore 18 of the opposed lug 14. The head 44 of the capscrew is provided with a diametral hole 45 through which a locking wire (not shown) may be run to prevent the capscrew from shaking loose.

The tubular driven member 34, previously mentioned, has a central box 46 that has an internal axial cavity 47 provided with upwardly tapering, female threads 48. An axial bore 49 is provided in the box and extends from the cavity 47 to the top of the box. A flange 51 is welded to the upper end of the box. This flange has upwardly opening recesses 52 that mate with the lugs 15 of the driving plate 13 in the same way as the lugs 14 mate with the recesses 39, as previously described. Capscrews 43 are provided for fastening the flange 51 to the lugs 15.

The several parts or components, shown in exploded representation in FIG. 3, are seen in assembled relationship in FIG. 4. The lugs 14 carried by the driven plate 12 are disposed within respective recesses 39 in the flange 38 of the tubular drive member 33, and are held therein by capscrews 43. Similarly the lugs 15 carried by the driving plate 13 are disposed within the recesses 52 in the flange 51 of the tubular driven member 34, and are held therein by other capscrews 43.

Figure 5:
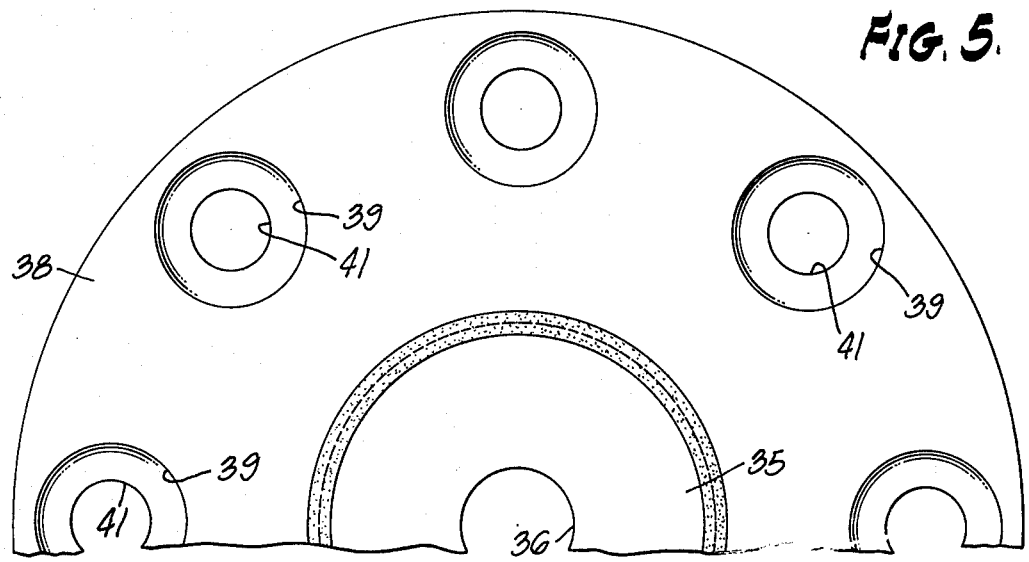
FIG. 5 is a fragmentary view taken along the line 5—5 of FIG. 4, with certain parts omitted.

Reference to FIG. 5 shows the circular disposition of the recesses 39 in the flange 38 of the tubular drive member.

In use, the assembly shown in FIG. 4 is incorporated in the drill string of a rotary blast hole drill, with the tubular drive member 33 threadedly attached by the threads 37 to a tubular drive shaft, and with one or a string of tubular drill steel sections threaded into the box 46 of the tubular driven member 34. The drill string terminates at its lower end in a rotary drill bit. In drilling, the drill string is rotated and forced downwardly to rotate and drive the bit into the rock being drilled. Compressed air is circulated down through the drill string, out through the bit, and up through the annulus between the drill string and the walls of the blast hole for the purpose of carrying the rock cuttings to the surface. Severe vibrations are set up in the drill string during drilling, and these vibrations are very effectively dampened by the rotary drive coupling unit of this invention, so that the vibrations are substantially isolated from the components of the rotary rock drill that are connected to the top of the shock absorbing coupling unit.

Referring to FIG. 4, it is seen that the coupling unit 11 provides an axial passage 53 extending therethrough that places the axial bore 36 of the tubular drive member 33 in fluid communication with the axial bore 49 of the tubular driven member 34 to conduct a downflowing stream of compressed air. The diameter of the passage 53 may be larger than the diameter of the axial bores 36 and 49 to allow space for the radially inward bulging of the elastomeric material when it is axially compressed, so that the air flow passage 53 is not thereby unduly restricted.

It will also be seen in FIG. 4 that clearance is provided between the shanks 42 of the capscrews 43 and the walls of the openings 41 in the flanges 38 and 51, so that torque is not directly transmitted between the flanges and the capscrews during drilling operations. Instead, the driving torque is transferred between the tabular members 33 and 34 and the coupling unit 11 substantially entirely through the lugs 14 and 15. Thus, the capscrews need only be designed to carry the load imposed by the weight of the drill string when it is raised from the bottom of the blast hole.

The metal discs 28 close the inner ends of the capscrew receiving bores 18 of the lugs 14 and 15. These discs project into the rubber body 31 and assist in transferring torque between the rubber and the plates 12 and 13. Moreover, during curing, discs prevent intrusion of rubber into the bores 18.

From the foregoing description, it is seen that the present invention provides a greatly improved shock absorbing rotary drive coupling unit for a rotary blast hole drill. The unit shown and described herein is intended to be exemplary of the invention rather than limitative thereof. The invention is defined in the claims, which are intended to be interpreted as broadly as the prior art will permit.

I claim:

1. A shock absorbing, rotary drive coupling unit for drivingly connecting a tubular drive shaft means to an axially aligned tubular driven shaft means of a rotary blast hole drill which comprises:
   an annular driven plate having an axis alignable with the common axis of said shaft means;
   an annular driving plate disposed parallel to and axially spaced from said driven plate;
   an annular body of resilient, elastomeric material sandwiched between said plates, one end of said body being bonded to one face of said driven plate and the other end of said body being bonded to the opposed face of said driving plate, said annular plates and said annular body providing an axial passage for the flow of pressurized drilling gas therethrough;
   each of said plates having a plurality of circularly arranged lug means projecting generally axially therefrom for respective engagement with complementary driving recess means on said tubular drive shaft means and with complementary driven recess means on said tubular driven shaft means; and
   complementary fastener elements cooperative between said plates and the respective drive shaft means and driven shaft means for maintaining said lug means and said lug receiving recess means in said seated engagement.

2. A coupling unit as defined in claim 1, in which the lug means are mounted on said plates, and the lug receiving recesses are formed on the tubular drive shaft means and the tubular driven shaft means.

3. A coupling unit as defined in claim 2, wherein
   said lug means comprise generally cylindrical members respectively affixed in corresponding holes in said plates with the axes of the cylindrical members oriented parallel to the axes of said plates; and
   said fastener elements comprise internally threaded bore means in said cylindrical members adapted to cooperate with complementary screw fastener elements also engageable respectively with the tubular drive shaft means and the tubular driven shaft means.

4. A coupling unit as defined in claim 3, wherein said internally threaded bore means extend entirely through said cylindrical members, and closure members respectively close the inner end openings of said bores.

5. A coupling unit as defined in claim 4, wherein
said closure members comprise discs covering the inner ends of said bores and welded to said cylindrical members.

6. A coupling unit as defined in claim 5, wherein
said discs project into said body of resilient elastomeric material.

7. In a rotary blast hole drill,
tubular drive shaft means including a driving flange;
tubular driven shaft means axially aligned with said tubular drive shaft means, and including a driven flange axially spaced from said driving flange;
a shock absorbing, rotary drive coupling unit drivingly connecting said driving flange to said driven flange;
said coupling unit comprising:
an annular driven plate having an axis alignable with the common axis of said shaft means;
an annular driving plate disposed parallel to and axially spaced from said driven plate;
an annular body of resilient, elastomeric material sandwiched between said plates, one end of said body being bonded to one face of said driven plate and the other end of said body being bonded to the opposed face of said driving plate, said annular plates and said annular body providing an axial passage for the flow of pressurized drilling gas therethrough;
each of said plates having a plurality of circularly arranged lug means projecting generally axially therefrom;
said driving flange providing recess means drivingly engaging the lug means projecting from said annular driven plate, and said driven flange providing recess means drivingly engaged by the lug means projecting from said annular driving plate;
complementary fastener elements securing said driving flange to said annular driven plate; and
complementary fastener elements securing said annular driving plate to said driven flange.

8. In a rotary blast hole drill as defined in claim 7, wherein
said lug means comprise generally cylindrical members affixed in corresponding holes in said plates with the axes of the cylindrical members oriented parallel to the axes of said plates; and
said fastener elements comprise internally threaded bore means in said cylindrical members adapted to cooperate with said complementary fastener elements.

9. A rotary blast hole drill as defined in claim 8, wherein said complementary fastener elements comprise screw fastener elements having threaded shank portions that are free from direct torque-transmitting engagement, respectively, with said driving flange and said driven flange.

10. A shock absorbing coupling unit for use in a rotary blast hole drill driving connection, comprising:
a pair of axially spaced annular plate members;
an annular body of resilient, elastomeric material sandwiched between said plate members and being bonded respectively to the inner confronting faces of said plate members;
a plurality of circularly spaced axially projecting cylindrical lugs secured to each of said plate members;
said lugs extending outwardly from the opposed outer surfaces of said plate members; whereby torque forces on the lugs are transmitted directly to said plate members rather than to the elastomeric materials; and
each of said lugs having an internally threaded bore.

11. A coupling unit as defined in claim 10, in which the inner end of each of said lugs is fixedly secured within an opening in the associated plate.

12. A coupling unit as defined in claim 11, in which the threaded bore is closed at its inner end by a closure member secured to the inner end face of the lug.

* * * * *